United States Patent
Ribbeck

(10) Patent No.: US 9,440,328 B2
(45) Date of Patent: Sep. 13, 2016

(54) METHOD FOR ASCERTAINING TOPOGRAPHY DEVIATIONS OF A DRESSING TOOL IN A GRINDING MACHINE

(71) Applicant: Klingelnberg AG, Zürich (CH)

(72) Inventor: Karl-Martin Ribbeck, Remscheid (DE)

(73) Assignee: Klingelnberg AG, Zurich (DE)

( * ) Notice: Subject to any disclaimer, the term of this patent is extended or adjusted under 35 U.S.C. 154(b) by 149 days.

(21) Appl. No.: 14/197,796

(22) Filed: Mar. 5, 2014

(65) Prior Publication Data
US 2014/0256224 A1    Sep. 11, 2014

(30) Foreign Application Priority Data
Mar. 5, 2013   (EP) ...................... 13157720

(51) Int. Cl.
| | | |
|---|---|---|
| B24B 53/00 | (2006.01) | |
| B24B 49/18 | (2006.01) | |
| B24B 53/06 | (2006.01) | |
| B23F 23/12 | (2006.01) | |

(52) U.S. Cl.
CPC ........... *B24B 53/00* (2013.01); *B23F 23/1225* (2013.01); *B24B 49/18* (2013.01); *B24B 49/186* (2013.01); *B24B 53/062* (2013.01)

(58) Field of Classification Search
CPC ....... B24B 47/25; B24B 49/18; B24B 53/00; B24B 53/062
See application file for complete search history.

(56) References Cited

U.S. PATENT DOCUMENTS 6,379,217 B1 *  4/2002  Thyssen ................... B23F 5/04
                                                                                451/5

FOREIGN PATENT DOCUMENTS

EP          1589317 B1     11/2007

\* cited by examiner

*Primary Examiner* — Timothy V Eley
(74) *Attorney, Agent, or Firm* — McCarter & English, LLP

(57) ABSTRACT

The invention relates to a method for ascertaining topography deviations of a dressing tool. The method includes executing a predefined relative movement of a dressing tool in relation to a dressable grinding tool, wherein during the execution of the relative movement, at least one contour region of the dressing tool is transferred into a transfer region of the grinding tool. A plunging body made of material which can be ground in the machine is provided. The transfer region of the grinding tool is moved into the vicinity of the plunging body by a relative infeed movement. A rotational movement of the grinding tool around an axis of rotation is executed. Plunging the transfer region of the grinding tool into the material of the plunging body, to thus perform a transfer of the topography of the transfer region into a imaging region of the plunging body. A scanning movement of the topography is performed of the plunging body using a coordinate scanning sensor and a computational ascertainment by means of a computer of at least one item of coordinate information, which permits a statement about the actual geometry of the dressing tool.

7 Claims, 7 Drawing Sheets

METHOD FOR ASCERTAINING TOPOGRAPHY DEVIATIONS OF A DRESSING TOOL IN A GRINDING MACHINE

CROSS-REFERENCE TO RELATED APPLICATIONS

This application claims priority under 35 U.S.C. §119(a)-(d) to European Patent Application No. EP 13 157 720.7, filed Mar. 5, 2013, which is hereby incorporated by reference in its entirety as part of the present disclosure as if fully set forth herein.

FIELD OF THE INVENTION

The object of the invention is a method for ascertaining geometry deviations of a dressing tool in a grinding machine, and also a grinding machine which is designed to execute this method.

BACKGROUND OF THE INVENTION

There are numerous machining methods in which grinding tools are used. Above all in the field of gear wheel machining, grinding tools are used which can be dressed. For example, there are grinding discs, which are nearly plate-shaped, and there are pot-shaped and conical grinding discs. These grinding tools are typically covered with an abrasive material, which is especially suitable for dressing.

In grinding machines, a dressing tool is frequently provided in addition to the grinding tool, which is used as needed to dress the grinding tool. Modern grinding machines typically comprise a rotationally-driven dressing tool, which is used for the contouring and dressing of the grinding tool in an automatic path-controlled manner.

For example, if this relates to the grinding machining of gear teeth, the working surfaces of the grinding tool must again be brought to the desired form (profile) after a certain time, to be able to ensure a sufficient quality of the gear teeth.

A dressing procedure is required for this purpose, for which a profile dressing method or a contour-generating, line-by-line dressing method can be used. In the case of profile dressing, the dressing tool has linear contact with the flanks of the grinding tool, while in the line-by-line dressing, a spot-shaped contact is provided. The dimensional accuracy of the grinding tool is reproduced by the dressing. In addition, the grinding tool is re-sharpened during the dressing.

The following relates to grinding machines, the dressing procedure of which is based on the principle of profile dressing or form dressing using a dressing roller or dressing disc. In the corresponding rotating profile dressing rollers or profile dressing discs, the geometry of the dressing roller is considered in the generation of the geometry/contour of the grinding disc. The geometry of the grinding disc is in turn already considered in the description of the workpiece geometry. These dressing tools are particularly suitable for complex profiles in mass production. The rotating form dressing rollers or form dressing discs generate or correct the contour of the grinding tool by way of CNC-path controlled travel along a pathway predefined at the controller. Diamond shaping plates can also be used as a dressing tool, which can be adapted precisely to the geometry of the grinding tool by means of laser technology.

The form and profile dressing processes are subject to numerous influencing variables, which can significantly influence the dressing of the grinding tool. In the case of form dressing, above all the geometry of the form dressing roller or form dressing disc, and the degree of overlap, play a large role. In the case of profile dressing rollers or profile dressing discs, the quality of the covering is of particular significance for the dressing result.

A CNC path-controlled dressing roller or dressing disc is preferably used as a dressing tool in the scope of the invention. The dressing tool can also be, as will be described hereafter, fixedly fastened in a rotationally drivable manner on the machine bed or another stationary or movable component of the machine. The path control necessary for the dressing is performed in this special case via CNC-controlled movements of the axes which move the grinding tool in relation to the dressing tool, while the dressing tool only rotates about the dressing axis.

One requirement for dressing using dressing tools is that a relative dressing (grinding) movement can occur between dressing tool and grinding tool. The dressing tool can rotate in the same direction or in the opposite direction as the grinding tool to be dressed. The velocity ratio between grinding tool and dressing tool is a further variable which influences the dressing result in the case of rotating dressing tools.

When working with profile dressing rollers or profile dressing discs, the relative movement is equal to the difference of the circumferential velocities of dressing tool and grinding tool. To generate the relative velocity in the circumferential direction, dressing tools are to be equipped with a separate rotational drive.

The profile accuracy, the true running, and the axial runout of the grinding tool also play a large role in the case of profile dressing.

Almost exclusively form rollers are used as dressing tools on newer grinding machines because of the better reproducibility of the dressing results. These are characterized by an active width which is smaller than the grinding disc width. The profile to be generated is typically generated via a path controller. These form rollers are very flexibly usable.

In the case of the chip-removing production of spiral bevel gears, one differentiates between the single indexing method and the continuous method, which is sometimes also referred to as the continuous indexing method. The single indexing method is a discontinuous method.

FIG. 1 shows a schematic side view of a section of a profile grinding disc 10 and a workpiece 1 (a spur wheel here). The profile grinding disc 10 rotates about the grinding tool axis of rotation R1 (referred to here as the tool axis of rotation in brief) and the workpiece 1 rotates about the workpiece axis R2. The workpiece axis R2 is not shown in FIG. 1. It is perpendicular to the plane of the drawing here. With a plunging movement E1, the profile grinding disc 10 is fed into a tooth gap, which is delimited by two teeth 2, 3. After the machining of the tooth gap, the profile grinding disc 10 is retracted and the workpiece 1 carries out an indexing rotation. The profile grinding disc 10 then plunges into another tooth gap, in order to thus machine the tooth flanks of one tooth gap after another.

An important method for the hard machining of bevel gears especially is grinding. Because of the complex geometric conditions, the hard machining is carried out in discontinuous operation "tooth gap by tooth gap". Mostly pot-shaped grinding discs are used here, which can be dressed. FIG. 2 shows a schematic partial view of the engagement of a pot-shaped grinding disc 10 in the tooth gap between two teeth 2, 3 of a crown wheel 1. The pot-shaped grinding disc 10 is shown in section.

FIG. 3 schematically indicates how such a pot-shaped grinding disc 10 can be dressed in a grinding machine 100 having a rotationally-driven dressing disc 30. At the moment shown, the dressing disc 30 dresses the grinding disc 10 on the outer circumference. For this purpose, the dressing disc 30 is seated outside and above the grinding disc 10. In order to dress the grinding disc 10 in its interior, the dressing disc 30 is moved by CNC control into another position located in the interior of the grinding disc and a rotational direction reversal is performed. In FIG. 3, the dressing disc 30 is shown by dashed lines in a position for dressing the inside of the profile 28 of the grinding disc 10. The CNC controller 50 (path controller) of the machine 100 transmits the required profile to the grinding disc 10, by guiding the dressing disc 30 by CNC control along the profile 28 of the grinding disc 10. In FIG. 3, the signals I1, I2 indicate the corresponding CNC control signals.

High-precision workpiece machining can only be carried out using a grinding tool 10, the dimensional accuracy and form accuracy of which lies within narrow tolerances. It must always be ensured that the grinding tool state is processing-capable.

Heretofore, experiential values have frequently been used to establish when and how often a grinding tool 10 must be dressed. Depending on the grinding process and size of the workpiece 1, the grinding tool 10 is dressed once or even multiple times per workpiece 1. It is apparent that wear of the grinding tool 10 and/or the dressing tool 30 can have a negative influence on the properties of the workpiece 1 to be ground.

It is well-known that a machine tool can be equipped with a coordinate scanning sensor, for example, to be able to measure the workpiece 1 during the machining or in machining pauses. Experiments indicate that such a coordinate scanning sensor does not appear to be suitable for measuring the dressing disc 20, or for measuring the grinding tool 1, however. A dressing tool 30 is typically covered with polycrystalline or natural diamond or coated with another hard material. The ruby feeler of a coordinate scanning sensor could be rapidly destroyed upon contact with such a dressing tool 30, especially because the ruby feeler must be guided by grinding line-by-line along the topography of the dressing tool 30 to be able to ascertain the actual geometry of the dressing tool 30. The grinding tools 10 have less hard coatings than the dressing tools 30. The surface of the grinding tools 10 is relatively rough or grainy—depending on the effective surface roughness, however. Therefore, it is only possible with great time expenditure to ascertain the actual geometry of a grinding tool 10. In addition, such a topography measurement has inaccuracies because of the graininess of the grinding tool 10.

SUMMARY OF THE INVENTION

The object therefore presents itself of developing a possibility which allows it to be recognized in a grinding machine having dressable grinding tool whether the dressing tool is worn or even damaged. An approach is preferably to be developed which may be used in an automated machine environment.

According to the invention, a method for ascertaining topography deviations of a dressing tool is provided, which is mounted so it is rotatably drivable about a dressing axis in a CNC-controlled (grinding) machine. The machine furthermore comprises a grinding tool, which is chucked on a grinding tool axis of rotation and can be dressed using the dressing tool. It is therefore a dressable grinding tool. The dressing tool initially has a target geometry and, after the dressing of one or more grinding tools, has an actual geometry, which can deviate from the target geometry depending on the situation. The invention is distinguished in that the following method steps are executed in the (grinding) machine:

(a) executing a relative movement of the dressing tool in relation to the grinding tool, wherein during the execution of the relative movement, at least one region of the dressing tool is transferred into a so-called transfer region of the grinding tool, (b) providing a plunging body made of material which can be ground in the machine, (c) executing a relative infeed movement to move the transfer region of the grinding tool into the vicinity of the plunging body, (d) executing a rotational movement of the grinding tool about the tool axis of rotation, (e) executing a relative plunging movement to plunge the transfer region of the grinding tool into the material of the plunging body, wherein during the execution of the relative plunging movement, a transfer of the topography of the transfer region into the plunging body in the form of a negative topography is performed, (f) carrying out an automated scanning movement of the negative topography of the plunging body using a coordinate scanning sensor, (g) relaying scanning signals from the coordinate scanning sensor to a computer, (h) computational ascertaining by means of the computer of at least one item of coordinate information, which permits a statement about the actual geometry of the dressing tool.

In all embodiments of the invention, a part of the steps can be carried out simultaneously or overlapping in time. This relates, for example, to steps c) and d) and possibly also e).

The invention therefore follows the novel path of using the grinding tool of the machine as a transfer means, to transfer a region of the dressing tool into a transfer region of the grinding tool. This transfer region is then imaged in a plunging body and scanned therein by means of a coordinate scanning sensor. As a result of the known coordinate relationships within the machine, it can be calculated from the measured values ascertained on the plunging body how the topography of the dressing tool appears, and/or whether the dressing tool deviates from a predefined standard and/or from predefined target values.

Coordinate transforms executed by computer are preferably used to convert the ascertained measured values into statements which relate to the dressing tool.

The invention operates particularly precisely, since both the dressing tool and also the scanning sensor are located in a defined location in or on the machine. A precise relationship is therefore always provided, which is advantageously used in the scope of the invention.

In particular in the field of automated mass production, an intervention can be made in a timely manner using the invention, before flawed grinding tools can be produced by a worn dressing tool and unsuitable gear wheels can be produced using these grinding tools.

Due to the use of the invention, grinding machines become more cost-effective and the machining can even be performed more precisely than heretofore under certain circumstances.

The invention may be used above all in CNC-controlled spiral bevel gear grinding machines or also in spur wheel grinding.

The invention allows optimized utilization of the machine capacity, an improvement of the automation of the dressing process, and repeatable, ultrahigh accuracies with a low proportion of rejects.

The invention allows the replacement intervals of the dressing roller to be lengthened and excessively frequent replacement of the dressing roller to be prevented. A higher profile consistency is achieved by the use of the invention, with elevated, i.e., lengthened service life of the dressing roller.

A method of the invention allows the dressing movement of the dressing tool, which is predefined (programmed) in the machine, to be adapted, so that in spite of a dressing tool which is worn to a certain degree, it can still be used for dressing the grinding tool. In this way, the replacement interval of the dressing tool can be optimized.

This relates to a path-bound method.

The invention may be applied above all to diamond-covered, boron-nitride-coated (e.g., cubic boron nitride, CBN™), silicon-carbide-coated, and aluminum-oxide-coated grinding tools.

The grinding machines are sometimes equipped with a diamond dressing roller, which is fixedly connected to the machine bed, to thus achieve very good precision. I.e., the diamond dressing roller does not require an additional machine axis here (except for its own axis of rotation). In such a case, depending on the embodiment, the grinding tool is moved toward the diamond dressing roller, while it rotates, to then be imaged therefrom by grinding in the plunging body.

The static and dynamic rigidities of the plunging body and its clamping or fastening exert a substantial influence on the accuracy of the method. Therefore, the plunging body is fixedly connected to the machine, preferably directly on the machine bed, in all embodiments.

Preferably, a coolant nozzle is attached in the region of the plunging body in all embodiments, to allow an optimally adapted coolant lubrication, while the geometry is imaged by grinding in the plunging body.

BRIEF DESCRIPTION OF THE DRAWINGS

Further details and advantages of the invention will be described hereafter on the basis of exemplary embodiments and with reference to the drawing.

DETAILED DESCRIPTION OF THE INVENTION

Terms are used in conjunction with the present description which are also used in relevant publications and patents. However, it is to be noted that the use of these terms is only to serve for better understanding. The ideas of the invention and the scope of protection of the patent claims are not to be restricted in the interpretation thereof by the specific selection of the terms. The invention may readily be transferred to other term systems and/or technical fields. The terms are to be applied accordingly in other technical fields.

All figures are schematic and are not to scale.

Figure 4:
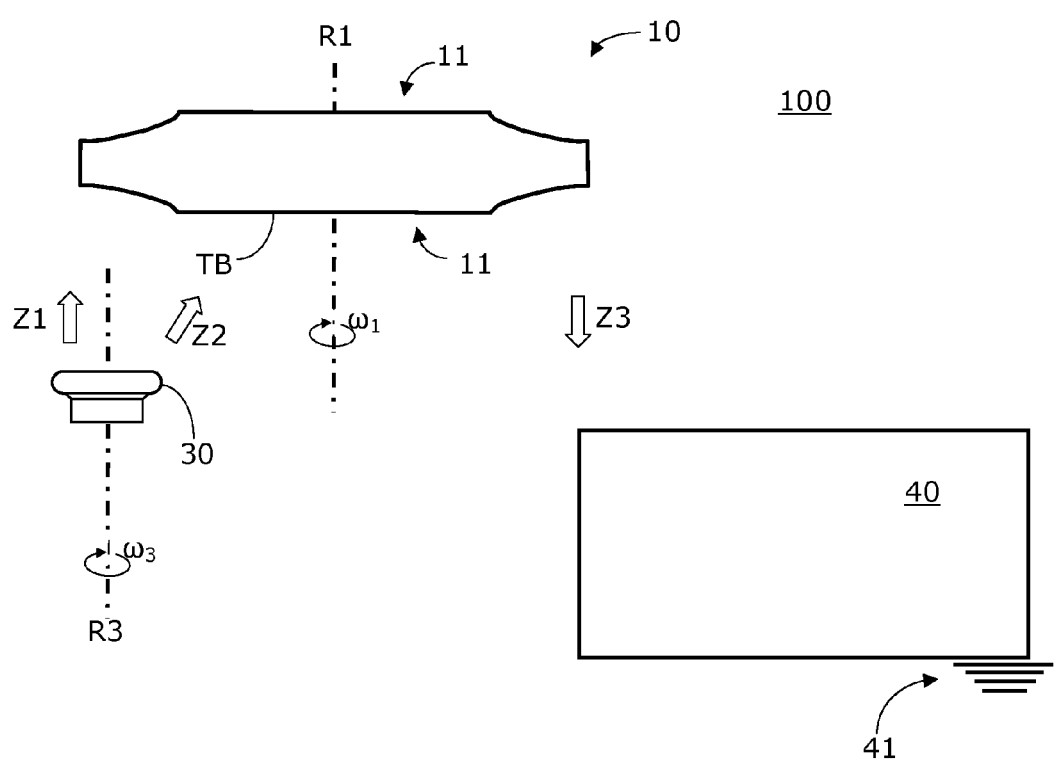
FIG. 4 shows a very schematic view of a grinding disc for spur wheel grinding, a dressing disc, and a plunging body of the invention.

The principle of the invention will be described hereafter on the basis of the greatly simplified schematic illustration of FIG. 4. FIG. 4 only shows the essential elements of a grinding machine 100 and the fundamental (relative) movements of these elements.

Figure 1:
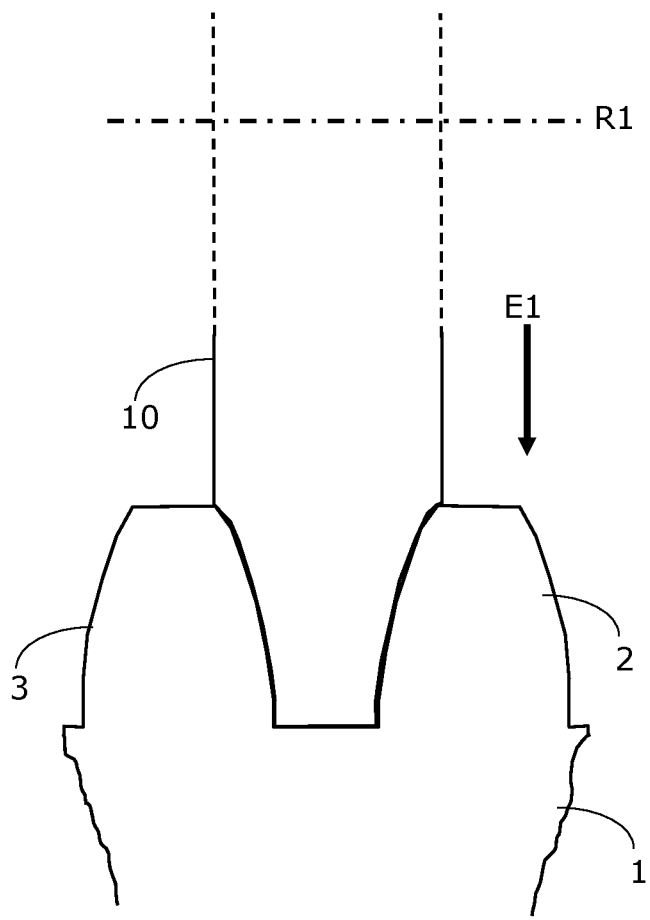
FIG. 1 shows a schematic side view of a part of a grinding disc during the machining of the tooth flanks of a tooth gap.

A side view of a (profile) grinding disc 10 can be seen, which can be rotationally driven about a tool axis R1. The rotational movement of the grinding disc is symbolized by ω1. A (form) dressing disc 30 is shown in scale to the grinding disc 10. The dressing disc 30 can be rotationally driven about a dressing axis R3. This rotational movement is symbolized by ω3. So as not to complicate the schematic illustration of FIG. 4, it is indicated by a block arrow Z1 that the dressing disc 30 can be moved in relation to the grinding disc 10 along a so-called machining movement. The corresponding movement Z1 can be carried out by the dressing disc 30 or the grinding disc 10. This does not relate to the machining movement which is executed when the grinding disc 10 is introduced into a tooth gap on the workpiece (for example, a workpiece 1 according to FIG. 1), but rather this relates to the regular dressing machining (dressing) of the grinding disc 10 using the dressing disc 30, as is well known from the prior art. Normally, the machining movement Z1 is a CNC-controlled relative movement in three-dimensional space.

According to the invention, from time to time a predefined relative movement of the dressing tool 30 in relation to the grinding tool 10 is executed, which is identified here with Z2. During the execution of this relative movement Z2, at least one contour region of the dressing tool 30 is transferred into a transfer region TB of the grinding tool 10 or a special grinding tool chucked for this task. This special grinding tool is a grinding disc only used for measuring the dressing tool 30. The term transfer region TB is used here to indicate that this is not a region of the grinding tool 10 which is used for the grinding machining of the workpiece (for example, a workpiece 1 according to FIG. 1), or that this relates to a region of the special grinding tool, wherein this special grinding tool is not used for the grinding machining of the workpiece. In a grinding disc according to FIG. 4, the transfer region TB can be located in the region of one of the end faces 11, for example, as indicated in FIG. 4. The block arrow, which illustrates the relative movement Z2, therefore points diagonally in the direction of the transfer region TB in the example shown.

As an essential step of the invention, a contour region of the dressing tool 30 is transferred into the transfer region TB of the grinding tool 10. Preferably, only the contour region of the dressing tool 30 is transferred, which is used during the regular dressing of the grinding disc 10. Imaging of all other regions of the dressing tool 30 is not absolutely necessary.

Now, in a following step, a relative infeed movement Z3 is executed, which is indicated in FIG. 4 by a further block arrow. In the scope of this relative infeed movement Z3, the transfer region TB of the grinding tool 100 is moved into the vicinity of a plunging body 40, which is stationary or is fastened on a body movable in the machine. In FIG. 4, the plunging body 40 is shown by a rectangle (for example, a rectangular sheet-metal piece). Since the static and dynamic rigidities of the plunging body 40 and the clamping or fastening thereof can have a large influence on the accuracy of the method according to the invention, the plunging body 40 is preferably fixedly connected to the machine 100, preferably directly on the machine bed, in all embodiments. This fixed connection (which is detachable if necessary) is identified with the reference sign 41 in FIG. 4.

A rotational movement $\omega 1$ of the grinding tool 10 about the tool axis of rotation R1 is then executed, while in the scope of a predefined, relative plunging movement, the transfer region TB of the grinding tool 10 is plunged into the material of the plunging body 40. The predefined, relative plunging movement is carried out such that a transfer of the topography of the transfer region TB into the plunging body 40 in the form of a negative topography is performed. I.e., the transfer region TB of the grinding tool 10 is "imaged" in the plunging body 40. Since the transfer region TB was previously machined with the contour of the dressing disc 30, a negative "image" of the contour of the dressing disc 30 is implemented on the plunging body 40 upon the transfer of the topography of the transfer region TB. The transfer region TB of the grinding tool 10 is only used as a form mediator in the scope of the invention.

After the instantaneous actual form of the dressing disc 30 has therefore been transferred to the plunging body 40, the negative topography (also called negative form NF) of the plunging body 40 is ascertained using a coordinate scanning sensor by an automated scanning movement in the machine 100. Scanning signals which have been detected by the coordinate scanning sensor are transmitted to a computer. This computer can be part of the machine 100 in all embodiments, or it can be a (workplace) computer, which can be linked by communication technology to the machine 100.

By means of the computer, at least one item of coordinate information is now computationally ascertained, which permits a statement about the actual geometry of the dressing tool 30. This item of coordinate information can be, for example, the instantaneous maximum diameter of the dressing tool 30.

The described principle will be further clarified hereafter on the basis of a greatly simplified example and with reference to FIGS. 5A to 5D.

Figure 5A:
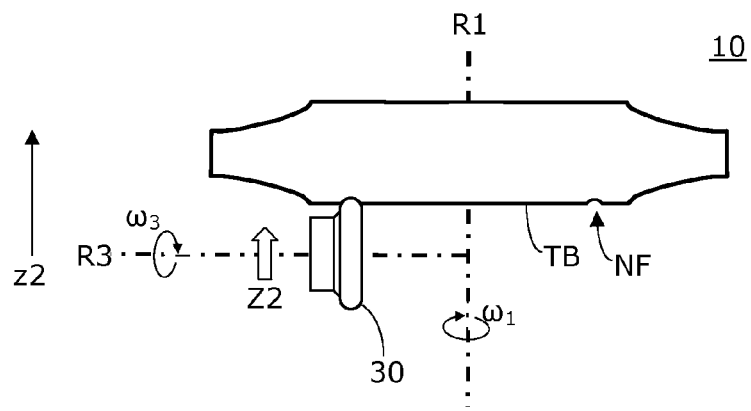
FIG. 5A shows a very schematic view of a grinding disc and a dressing disc during the plunging into a transfer region of the grinding disc.

FIG. 5A schematically shows how the dressing tool 30, after it has been pivoted by 90° in relation to FIG. 4 (in special cases, the grinding tool 10 can be pivoted, while the dressing tool 30 remains in its original alignment), plunges in the scope of the relative movement Z2 into the transfer region TB in the end face 11 of the grinding tool 10. For the sake of simplicity, in the example shown, the dressing tool 30 plunges into the transfer region TB parallel to the direction of the tool axis R1. Since at least during this plunging, both the dressing tool 30 and also the grinding tool 10 rotate (i.e., $\omega 1 \neq 0$; $\omega 3 \neq 0$), a ring-shaped "track" lying concentrically to the tool axis R1 is generated in the transfer region. This "track" represents a negative form NF of the contour of the dressing tool 30.

Figure 5B:
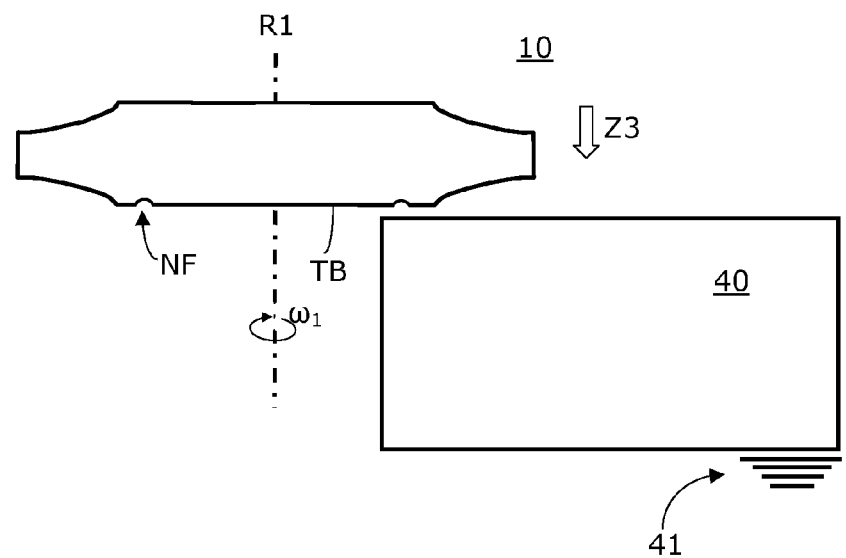
FIG. 5B shows a very schematic view of the grinding disc during the transfer to a plunging body.

Since scanning the rough surface of the grinding tool 10 is linked to disadvantages, as mentioned at the beginning, this negative form NF is transferred in a next step into a plunging body 40. This step is schematically shown in FIG. 5B. In this step, the relative infeed movement Z3 is executed such that in the scope of this relative infeed movement Z3, the transfer region TB of the grinding tool 100 is moved into the vicinity of a stationary plunging body 40 (fastened on the machine 100) or in the direction of a plunging body 40 movable in the machine. In FIG. 5B, the plunging body 40 is shown by a rectangle (for example, in the form of a rectangular sheet-metal piece).

Figure 5C:
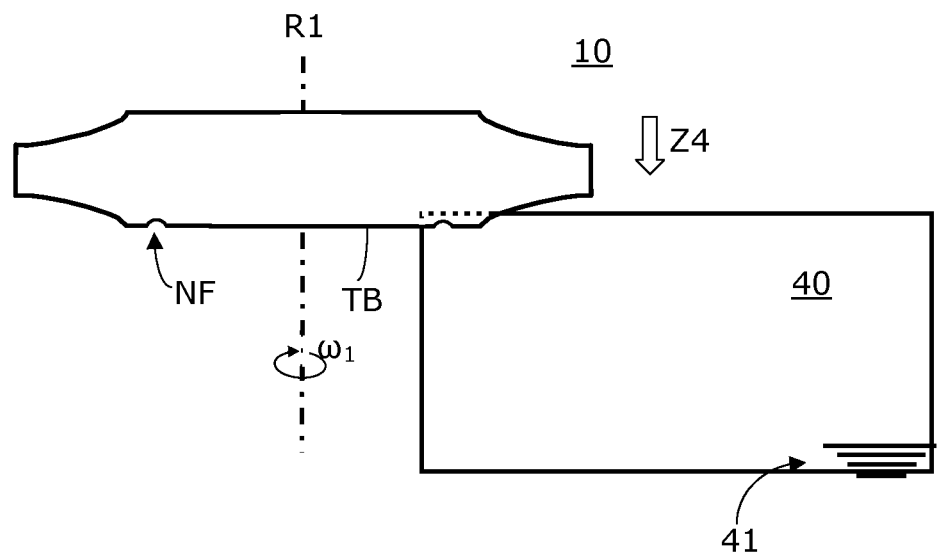
FIG. 5C shows a very schematic view of the plunging of the transfer region of the grinding disc into the plunging body.

FIG. 5C shows how, by the execution of a predefined, relative plunging movement Z4, the transfer region TB of the grinding tool 10 is transferred into the material of the plunging body 40. During the execution of the plunging movement Z4, in principle a transfer of the topography of the transfer region TB into the plunging body 30 is performed. With respect to the topography or contour of the dressing tool 30, the form transferred into the plunging body 30 is referred to as positive topography (also called positive form PF).

Figure 5D:
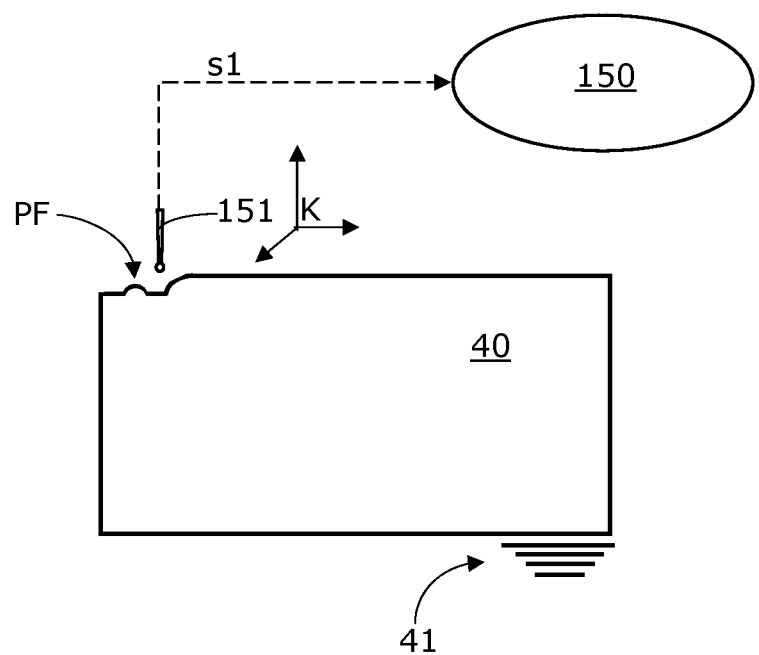
FIG. 5D shows a very schematic view of the scanning of the profile of the plunging body.

To be able to detect this positive form PF metrologically, an automated scanning movement of the topography PF of the plunging body 40 is carried out using a coordinate scanning sensor 151, as schematically indicated in FIG. 5D. In the case of a stationary fastened plunging body, it must be ensured that the feeler can scan without collision. If the plunging body is fastened on a movable body, this body can move into an optimum scanning position. The scanning can be performed in a tactile or contactless manner. Various methods and means are known for this purpose, which a person skilled in the art can use without problems. It is indicated by a coordinate system K in FIG. 5D that the coordinate scanning sensor 151 can be guided in relation to the positive form PF, to scan this form PF. During the scanning, scanning signals s1 are provided. These scanning signals s1 are transferred from the coordinate scanning sensor 151 to a computer 150, as indicated in FIG. 5D by a dashed arrow.

On the basis of the scanning signals s1, the computer 150 can ascertain (calculate), for example, the entire positive form PF or one or more detail aspects of the positive form PF, if this is desired. In the course of one or more coordinate transforms, the computer 150 can ascertain at least one item of coordinate information, which permits a statement about the actual geometry of the dressing tool 30, from the scanning signals s1 directly or via intermediate steps. If one presumes for the moment that the transfer steps all run in a lossless manner and no inaccuracies arise, the positive form PF on the plunging body 40 thus corresponds one-to-one to the instantaneous actual form or actual geometry of the dressing tool 30. This simplified assumption only applies if the dressing tool 30 was plunged into the transfer region using a simple, linear plunging movement parallel to the axis R1. If further movements were executed during the plunging (for example, a relative pivot of the dressing tool 30 in relation to the grinding tool 10), the relative movements must be taken into consideration when ascertaining/calculating the actual form or actual geometry of the dressing tool 30. This is possible in any case, because these relative movements relate to the predefined, relative plunging movement Z4. I.e., the computer 150 knows these plunging movements Z4 or it can image them in the coordinate system K.

Since the transfer steps which are executed according to the invention are always subject to inaccuracies in practice, tolerances must be expected when ascertaining/calculating the actual form or actual geometry.

For example, if the maximum diameter of the dressing tool 30 decreases with time (the diameter becomes smaller and smaller by wear), the positive form PF in FIG. 5D also becomes smaller and smaller. For example, if the thickness of the dressing tool 30 (parallel to the axis R3) decreases with time (the thickness becomes smaller and smaller by wear), the positive form PF becomes narrower and narrower in FIG. 5D.

Preferably, the at least one item of coordinate information is used according to the invention for the purpose of adapting the relative machining movements (dressing movements) appropriately during the dressing of the grinding disc 10 using the dressing tool 30. For example, in the case of a dressing tool 30 having reduced maximum diameter, the relative infeed movement Z2 in FIG. 5A must be enlarged, so that the dressing tool 30 can still be moved into contact with the grinding disc 10 in spite of reduced circumference. The computer 150 can also already derive a valuable item of information from this fact. For example, in the case of a new dressing disc 30 (i.e., a dressing disc 30 which has the target form), if a contact with the transfer region TB of the grinding disc 10 occurs at a coordinate z2=0, it can then be ascertained, during the plunging Z2 of a worn dressing disc 30 at a later point in time, at which coordinate position z2 the contact occurs. For example, if z2=1 mm at the point in time of the contact, the radius of the dressing disc 30 has decreased by 1 mm.

Since other changes of the topography or contour of the dressing tool 30 usually also result in addition to the circumference reduction, in preferred embodiments, the CNC-controlled movement sequences are adapted in two or even three dimensions to the changing actual topography.

According to one preferred embodiment of the invention, at least one limiting value can also be predefined, upon the reaching of which the dressing tool 30 is to be replaced.

Additionally or alternatively, an observation of the surface of the positive form PF on the plunging body 40 can be performed using the coordinate scanning sensor 151 or using another scanning tool or sensor, for example, to be able to recognize surface changes on the dressing tool 30 in a timely manner on the basis of an analysis of the signals of the sensor. Such another scanning tool or such a sensor can be provided in addition to the coordinate scanning sensor 151 in the machine 100.

Figure 2:
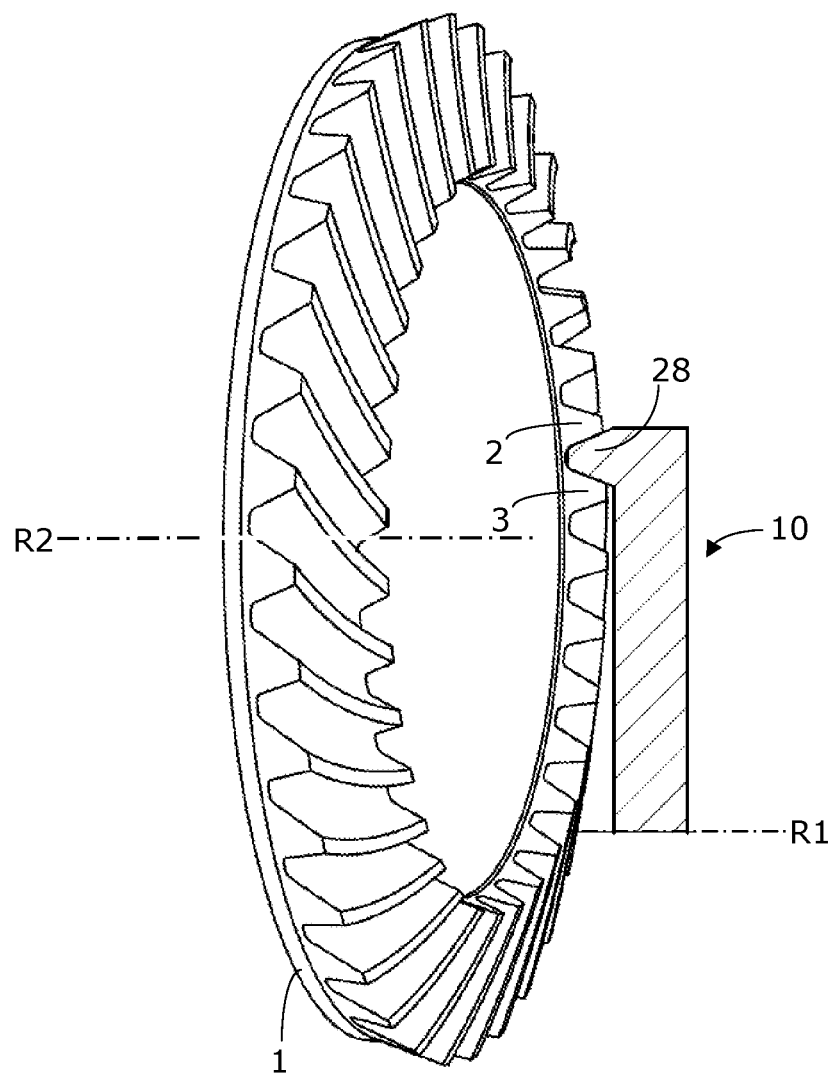
FIG. 2 shows a schematic sectional view and side view of a part of a grinding cup wheel during the machining of the tooth flanks of a tooth gap of a crown wheel.
Figure 3:
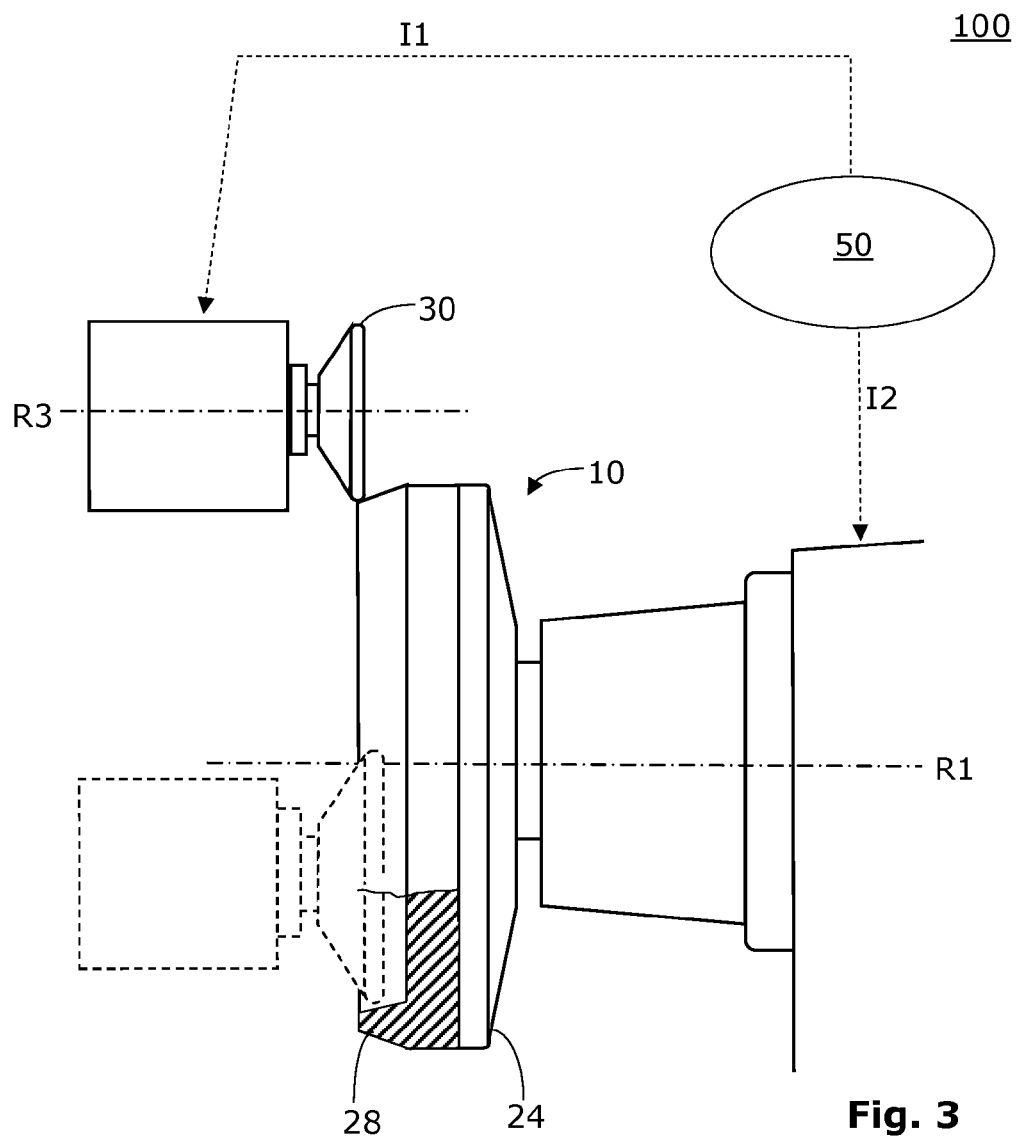
FIG. 3 shows a schematic side view of a part of a grinding machine having a grinding cup wheel, which is dressed on the outer periphery by means of a grinding disc (the dressing of the inner circumference using the dressing disc is indicated by dashed lines)
Figure 6:
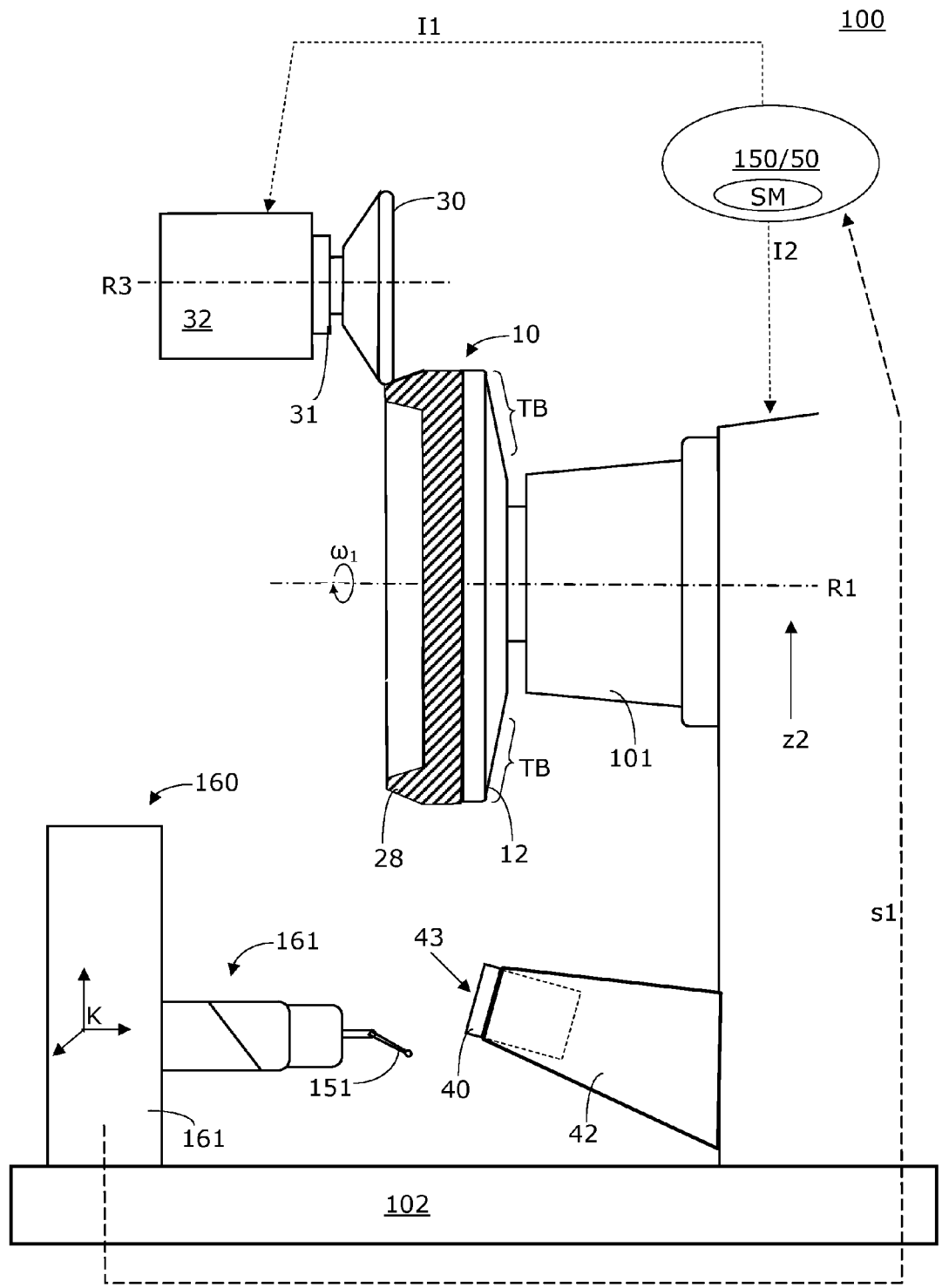
FIG. 6 shows a schematic side view of a grinding machine according to FIG. 2, wherein the grinding cup wheel is shown in partial section, and the grinding machine comprises a plunging body and a coordinate scanning sensor.

FIG. 6 shows a schematic side view of a grinding machine 100 according to FIG. 2, wherein the grinding cup wheel 10 is shown in partial section, and the grinding machine 100 comprises a plunging body 40 and a coordinate scanning sensor 151.

In the exemplary embodiment shown in FIG. 6, a grinding disc is used as the grinding tool 10, which has the transfer region TB in a rear region 12 (which is oriented here in the direction of tool spindle 101). The transfer region TB runs here in a ring shape along a slightly conical truncated cone surface.

The plunging body 40 can be connected in all embodiments directly to the machine bed 102 or to a body of the machine 100 which is movable in the machine. A stable mount 42 is preferably used in all embodiments, which allows location-fixed and stable chucking of the plunging body 40. In the embodiment shown, the frontmost region 43 of the plunging body 40 is arranged such that the required contact of the transfer region TB of the grinding tool 10 with the frontmost region 43 can be produced without problems by the execution of CNC-controlled movements. In the example shown, the tool spindle 101 including grinding tool 10 must execute a linear movement in the negative z2 direction and possibly a linear movement parallel to the R1 axis, to produce the contact.

As part of a coordinate measuring system 160, the coordinate scanning sensor 151 is preferably also connected in all embodiments to the machine bed 102 of the machine 100, as indicated in FIG. 6. The coordinate measuring system 160 can comprise a measuring tower 161, for example, which comprises a precisely guided, movable boom 162. The boom 162 can have, for example, a carriage system having parallelogram construction according to EP Patent EP 1 589 317 B1 of Klingelnberg GmbH. The coordinate system K on the measuring tower 161 is to indicate that it is preferably a 3-D coordinate measuring system 160, which is used in all embodiments of the invention.

To be able to bring the relative topography of the dressing tool 30 into contact with the transfer region TB, corresponding relative movements must be executed, as described. The corresponding axes are not shown here. These relative movements are preferably controlled/coordinated by the CNC controller 50 in all embodiments of the invention.

It is indicated in FIG. 6 that the CNC controller 50 can assume the function of the mentioned computer 150, or vice versa. Controller 50 and computer 150 can also be embodied separately, however.

The invention is preferably used in all embodiments in a CNC-controlled machine 100, which comprises a CNC controller 50 and a tool spindle 101 for the rotationally-drivable fastening of a grinding tool 10. Furthermore, the machine 100 comprises a device 32, which has a dressing spindle 31 having a dressing tool 30, and which comprises a coordinate measuring system 160, which carries a scanning sensor 151. The machine 100 is distinguished in that it additionally comprises a plunging body 40, which is connected to the machine 100. The plunging body 40 is arranged inside the machine 100 such that a transfer region TB of the grinding tool 10 can be moved into contact with the plunging body 40, while the grinding tool 10 rotates about the tool axis R1 of the tool spindle 101. Furthermore, the dressing tool 30 can be moved into contact with the transfer region TB of the grinding tool 10, while the grinding tool 10 rotates around the tool axis R1 and/or the dressing tool 30 rotates about the dressing axis R3 of the dressing spindle 31.

Preferably, all embodiments of the machine 100 comprise a software module SM (see FIG. 6), which is designed for the purpose of analyzing signals s1 of the coordinate measuring system 160 and ascertaining at least one item of coordinate information, which permits a statement about the actual geometry of the dressing tool 30.

The software module SM is preferably designed in all embodiments such that at least one computer coordinate transform can be executed to ascertain the item of coordinate information.

Preferably, all embodiments of the invention comprise a realignment or compensation for wear of the dressing tool 30. The controller 50 and/or the computer 150 can take influence on the CNC-controlled movement sequences of the machine 100 for this purpose.

The software module SM is preferably designed in all embodiments such that a message or a signal is output if the statement about the actual geometry of the dressing tool 30 indicates that the dressing tool 30 lies outside a tolerance value and/or if another evaluation criterion is not met.

The software module SM is preferably designed in all embodiments such that the message or the signal triggers a replacement of the dressing tool 30.

What is claimed is:

1. A method for ascertaining topography deviations of a dressing tool, which is mounted so it is rotationally drivable about a dressing axis in a CNC-controlled machine, which comprises a dressable grinding tool, which is chucked on a tool rotational axis, wherein the dressing tool has a target geometry, and wherein the dressing tool has an actual geometry, which deviates from the target geometry, after a dressing of the grinding tool in the machine, comprising:
   (a) executing a predefined relative movement of the dressing tool in relation to the grinding tool, wherein during the execution of the relative movement, at least one contour region of the dressing tool is transferred into a transfer region of the grinding tool;
   (b) providing a plunging body made of material which can be ground in the machine;
   (c) executing a relative infeed movement, to move the transfer region of the grinding tool into the vicinity of the plunging body;
   (d) executing a rotational movement of the grinding tool about the tool rotational axis;
   (e) executing a predefined, relative plunging movement, to plunge the transfer region of the grinding tool into the material of the plunging body, wherein during the execution of the plunging movement, a transfer of a topography of the transfer region into an imaging region of the plunging body in the form of a negative topography is performed;
   (f) carrying out an automated scanning movement of the negative topography of the plunging body in the imaging region using a coordinate scanning sensor;
   (g) transmitting scanning signals from the coordinate scanning sensor to a computer; and
   (h) computationally ascertaining, by means of the computer, at least one item of coordinate information, and determining a statement about the actual geometry of the dressing tool.

2. The method according to claim 1, wherein at least two of the steps (a), (b), (c), (d), (e), (f), (g), or (h) are carried out simultaneously or chronologically overlapping.

3. The method according to claim 1, wherein, during the execution of the predefined relative movement of the dressing tool in relation to the grinding tool, the dressing tool is brought into contact with the grinding tool, while the dressing tool rotates about the dressing axis and the grinding tool rotates about the tool rotational axis, to thus transfer a part of a topography of the dressing tool into the transfer region of the grinding tool.

4. The method according to claim 1, wherein, after the transfer of the topography, a relative retraction movement is executed to remove the transfer region of the grinding tool from the material of the plunging body.

5. The method according to claim 1, wherein the coordinate scanning sensor is an integrated component of the machine.

6. The method according to claim 1, comprising ascertaining the actual geometry of the dressing tool to be performed in the machine indirectly by the use of the plunging body, wherein during this ascertainment of the actual geometry, the dressing tool does not have to be removed or remounted.

7. The method according to claim 1, comprising adapting a dressing movement of the dressing tool in the machine, so that even when the dressing tool is worn to a certain extent, it can still be used for dressing the grinding tool.

* * * * *